(12) United States Patent
Nagai

(10) Patent No.: US 6,659,242 B2
(45) Date of Patent: Dec. 9, 2003

(54) HYDRAULIC SHOCK ABSORBER FOR VEHICLE

(75) Inventor: Osamu Nagai, Shizuoka (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 10/238,498

(22) Filed: Sep. 10, 2002

(65) Prior Publication Data
US 2003/0173170 A1 Sep. 18, 2003

(30) Foreign Application Priority Data

Mar. 14, 2002 (JP) ........................................ 2002-071008

(51) Int. Cl.⁷ ............................................. B62K 25/08
(52) U.S. Cl. ....................... 188/315; 188/297; 188/316; 188/269; 267/64.15; 267/64.26
(58) Field of Search ................................. 188/316, 297, 188/314, 315, 322.19, 322.15, 322.22, 269, 322.17, 322.16; 280/276, 275, 279, 283; 267/64.15, 64.16, 64.17, 64.26

(56) References Cited

U.S. PATENT DOCUMENTS

| | | | | |
|---|---|---|---|---|
| 4,057,264 A | * | 11/1977 | Suzuki et al. ............... | 280/276 |
| 4,964,625 A | * | 10/1990 | Kawamura ................... | 267/221 |
| 5,934,697 A | * | 8/1999 | McAndrews ................. | 280/276 |
| 6,155,541 A | * | 12/2000 | Farris et al. ............. | 267/64.15 |
| 6,234,505 B1 | * | 5/2001 | Ito .............................. | 280/276 |

OTHER PUBLICATIONS

Translation of submitted JP 63–23957.*

Japanese Examined Patent Publication No. SHO 63–23957.

* cited by examiner

Primary Examiner—Douglas C. Butler
(74) Attorney, Agent, or Firm—Orum & Roth

(57) ABSTRACT

In a hydraulic shock absorber in which a piston is slidably in contact with an inner periphery of an inner tube, a cross sectional area S1 of an annular oil chamber which is sectioned by an inner periphery of an outer tube and an outer periphery of the inner tube is formed larger than a cross sectional area of a piston rod. A check valve which inhibits a flow from an oil chamber to an oil storage chamber at a time of an expansion side stroke is provided in a partition member which is provided in an inner periphery of the inner tube, and a micro flow passage which communicates the oil chamber with the oil storage chamber is provided in the partition member.

3 Claims, 5 Drawing Sheets

HYDRAULIC SHOCK ABSORBER FOR VEHICLE

BACKGROUND OF THE INVENTION

1. Field of the Invention

The present invention relates to a hydraulic shock absorber for a vehicle.

2. Description of the Related Art

A conventional hydraulic shock absorber includes a damper cylinder provided in inner portions of an outer tube and an inner tube, and a piston is slidably in contact with an inner periphery of the damper cylinder. As described in Japanese Examined Patent Publication (JP-B) No. 63-23957, to simplify the structure and reduce the number of parts, there is provided a structure in which a piston is slidably in contact with an inner periphery of the inner tube without the damper cylinder.

The conventional hydraulic shock absorber is structured to: slidably insert an inner tube within an outer tube via bushes which are respectively fixed to an opening portion in an inner periphery of the outer tube and a front end portion in an outer periphery of the inner tube; section an annular oil chamber which is surrounded by the inner periphery of the outer tube, the outer periphery of the inner tube and the two bushes; provide with a partition member in an inner periphery of the inner tube so as to section an oil chamber in a lower portion, slidably insert a piston rod which is mounted to the outer tube to the partition member; fix a piston which is slidably in contact with the inner periphery of the inner tube to a front end portion of the piston rod which is inserted to the inner tube so as to section the oil chamber into a piston rod side oil chamber in which the piston rod is received and a piston side oil chamber in which the piston rod is not received, and; communicate the annular oil chamber with the piston rod side oil chamber via an oil hole which is provided in the inner tube.

In this structure, a cross sectional area of the annular oil chamber is set to be substantially equal to a cross sectional area of the piston rod. A volume compensation chamber which is formed by an elastic tube body absorbing a volume expansion of a working fluid is provided in the oil chamber in an inner portion of the inner tube.

Accordingly, the working fluid which corresponds to a move-into volumetric capacity of the piston rod moving into the inner tube in a compression stroke is transferred to the annular oil chamber from the oil chamber in the inner periphery of the inner tube via the oil hole of the inner tube. Further, the working fluid which corresponds to a move-out volumetric capacity of the piston rod moving out from the inner tube in an expansion stroke is transferred to the oil chamber in the inner periphery of the inner tube from the annular oil chamber via the oil hole of the inner tube. Further, a volumetric capacity expansion due to a temperature increase of the oil is compensated by the volume compensation chamber which is provided in the inner portion of the inner tube.

In the conventional art, since the structure is made such that the cross sectional area of the annular oil chamber is set to be substantially equal to the cross sectional area of the piston rod, the following problems are generated.

(1) It is very delicate to set the outer diameter of the piston rod and the annular gap between the outer tube and the inner tube, and a pressure condition in the inner portion of the inner tube changes according to differences in size due to a tolerance in the working size.

(2) In the case of using the piston rod having a constant outer diameter, it is necessary to make the annular gap narrow as the inner tube has the larger diameter, resulting in a limitation in design.

(3) In the case that the annular gap is fixed, it is necessary to make the outer diameter of the piston rod larger as the inner tube has the larger diameter, with the result that it is impossible to make the parts of the piston rod common.

SUMMARY OF THE INVENTION

An object of the present invention is to provide a hydraulic shock absorber in which a piston is slidably in contact with an inner periphery of an inner tube, wherein no delicate operation is required for setting an annular gap between an outer tube and an inner tube.

According to the present invention, there is disclosed a hydraulic shock absorber for a vehicle which is structured as follows.

An inner tube is slidably insertable within an outer tube via bushes which are respectively fixed to an opening portion in an inner periphery of the outer tube and a front end portion in an outer periphery of the inner tube.

An annular oil chamber which is surrounded by the inner periphery of the outer tube, the outer periphery of the inner tube and the two bushes is sectioned.

A partition member is disposed in an inner periphery of the inner tube so as to section an oil chamber in a lower portion and section an air chamber in an upper portion.

A piston rod which is mounted to the outer tube is slidably insertable to the partition member.

A piston which is slidably in contact with the inner periphery of the inner tube is fixable to a front end portion of the piston rod which is inserted to the inner tubes, so as to section the oil chamber into a piston rod side oil chamber in which the piston rod is received and a piston side oil chamber in which the piston rod is not received.

An annular oil chamber is communicatable with the piston rod side oil chamber or the piston side oil chamber via an oil hole which is provided in the inner tube.

A cross sectional area of the annular oil chamber is formed larger than a cross sectional area of the piston rod. A check valve which inhibits a flow from the oil chamber into the oil storage chamber at a time of an expansion side stroke is provided in the partition member. A micro flow passage which passes through the oil chamber and the oil storage chamber is provided in the partition member.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENTS

Figure 1:
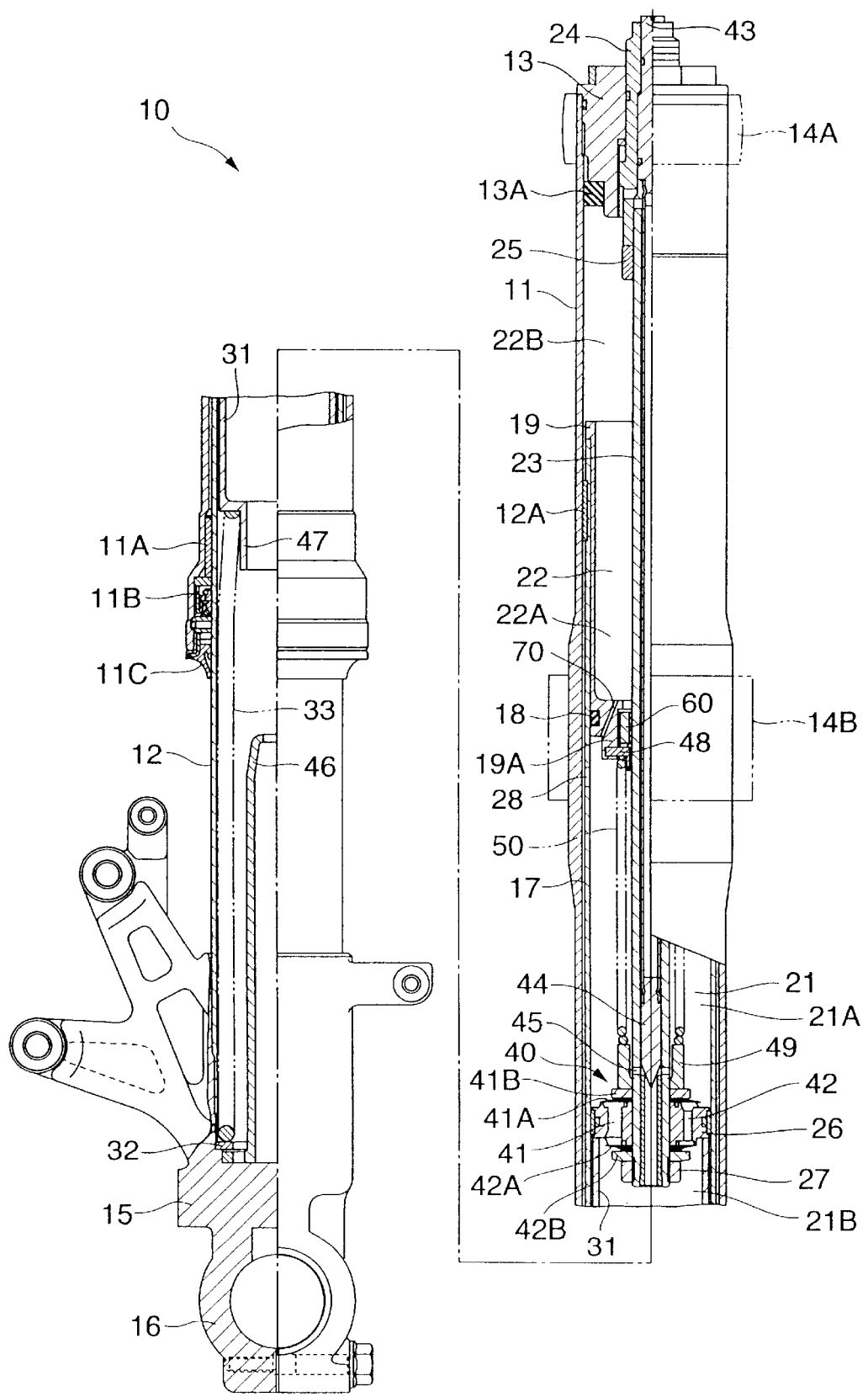
FIG. 1 is a cross sectional view which shows the entire hydraulic shock absorber.
Figure 2:
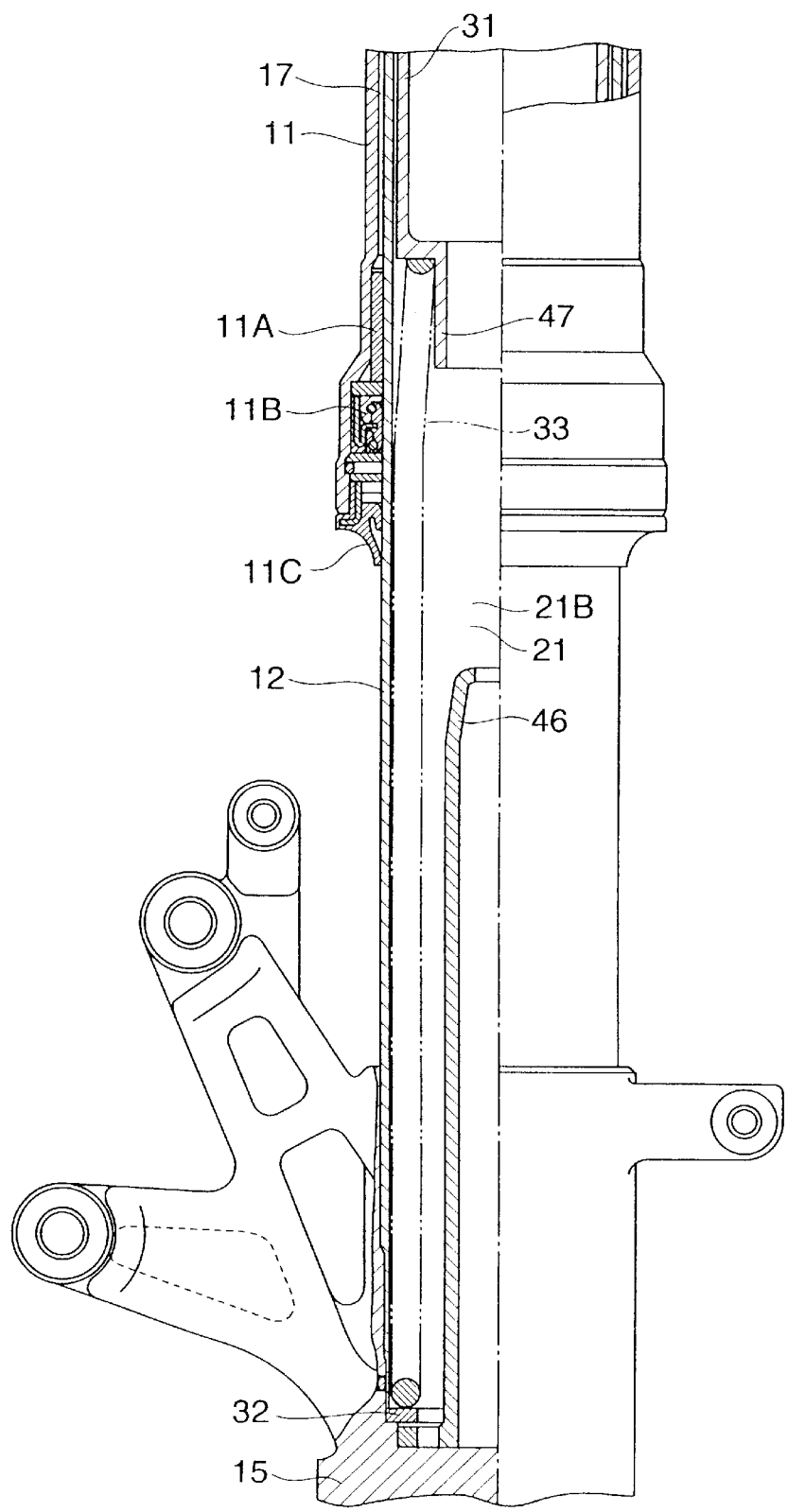
FIG. 2 is a cross sectional view which shows a main portion in a lower end side in FIG. 1 in an enlarged manner.
Figure 3:
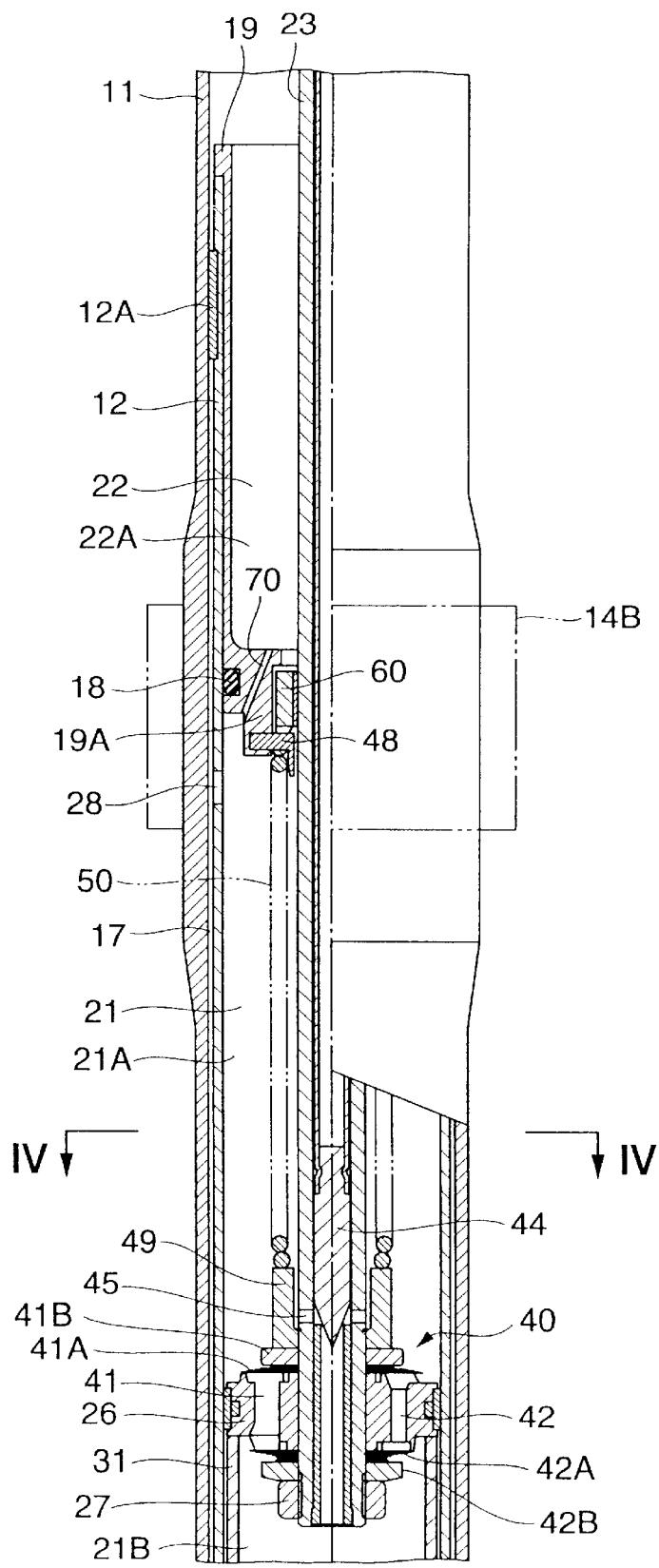
FIG. 3 is a cross sectional view which shows a main portion in an upper end side in FIG. 1 in an enlarged manner.

A hydraulic shock absorber 10 is structured, as shown in FIG. 1 to FIG. 3, such that an inner tube 12 is slidably inserted to an inner portion of an outer tube 11 via a bush 11A which is fixed to an inner periphery of a lower end opening portion of the outer tube 11, and a bush 12A which is fixed to an outer periphery of an upper end opening portion of the inner tube 12. Reference symbol 11B denotes an oil seal, and reference symbol 11C denotes a dust seal. A cap 13 is engaged with and attached to an upper end opening portion of the outer tube 11 in a liquid tight manner. Vehicle body side mounting members 14A and 14B are provided in an outer periphery of the outer tube 11. A bottom bracket 15 is engaged with and attached to a lower end opening portion of the inner tube 12 in a liquid tight manner. A tire wheel side mounting portion 16 is provided in the bottom bracket 15.

The hydraulic shock absorber 10 sections an annular oil chamber 17 which is surrounded by an inner periphery of the outer tube 11, an outer periphery of the inner tube 12, and two bushes 11A and 12A.

The hydraulic shock absorber 10 which is provided with a partition member 19 in a liquid tight manner via an O-ring 18 in an inner periphery in an upper end side of the inner tube 12, sections an oil chamber 21 in a lower portion rather than a rod guide portion 19A of the partition member 19, and sections an oil storage chamber 22 in an upper portion. In the oil storage chamber 22, a lower side area forms an oil chamber 22A and an upper side area forms an air chamber 22B.

The hydraulic shock absorber 10 slidably inserts a piston rod 23 which is mounted to the outer tube 11 to the rod guide portion 19A of the partition wall member 19. In particular, a spring load adjusting sleeve 24 is engaged with and attached to a center portion of the cap 13 in a liquid tight manner. The hollow piston rod 23 is engaged with and is attached to a lower end portion of the sleeve 24 which is inserted to the oil storage chamber 22, which are fixed by a lock nut 25.

The hydraulic shock absorber 10 fixes a piston 26 which is slidably in contact with the inner periphery of the inner tube 12, to a leading end portion of the piston rod 23 which is inserted to the inner tube 12 from the rod guide portion 19A of the partition member 19. It also sections the oil chamber 21 into a piston rod side oil chamber 21A in which the piston rod 23 is received, and a piston side oil chamber 21B in which the piston rod 23 is not received. The piston 26 is fixed by a nut 27.

The hydraulic shock absorber 10 communicates the annular oil chamber 17 with the piston rod side oil chamber 21A via an oil hole 28 which is provided in the inner tube 12. In this case, the annular oil chamber 17 may be structured such as to be communicated with the piston side oil chamber 21B via the oil hole 28 which is provided in the inner tube 12.

The hydraulic shock absorber 10 has a spring collar 31 abutted against a lower end surface facing to the piston side oil chamber 21B of the piston 26, has a spring seat 32 sitting on a bottom portion of the inner tube 12, and has a suspension spring 33 interposed between the spring collar 31 and the spring seat 32. The hydraulic shock absorber 10 moves the piston rod 23 and the piston 26 upward and downward by screwing the spring load adjusting sleeve 24 mentioned above, and adjusts a spring load of the suspension spring 33 based on this vertical movement. The hydraulic shock absorber 10 absorbs an impact force which is applied from a road surface during vehicle travel according to a compression and expansion vibration of the suspension spring 33.

The hydraulic shock absorber 10 is provided with a damping force adjusting apparatus 40 in the piston 26.

The damping force adjusting apparatus 40 is provided with a compression side flow passage 41 and an expansion side flow passage 42. The compression side flow passage 41 is opened and closed by a compression side disc valve 41A which is backed up by a valve stopper 41B. The expansion side flow passage 42 is opened and closed by an expansion side disc valve 42A which is backed up by a valve stopper 42B.

The damping force adjusting apparatus 40 accepts attachment of an adjustment rod 43 to a center portion of the spring load adjusting sleeve 24 by screwfitting in a liquid tight manner. An inserted needle valve 44 which is fixed to the adjust rod 43 to a hollow portion of the piston rod 23 adjusts an opening degree of a bypass passage 45 which is provided in the piston rod 23 based on a vertical motion of the needle valve 44. The bypass passage 45 bypasses the piston 26 and communicates the piston rod side oil chamber 21A with the piston side oil chamber 21B.

The damping force adjusting apparatus 40 generates a compression side damping force based on a passage resistance of the bypass passage 45 which is adjusted in its opening degree by the needle valve 44 during low speed operation. The damping force adjusting apparatus 40 generates the compression side damping force based on a deflection of the compression side disc valve 41A, at middle and high speed areas, in a compression side stroke. Further, in an expansion side stroke, the damping force adjusting apparatus 40 generates the expansion side damping force based on the passage resistance of the bypass passage 45 which is adjusted in opening degree by the needle valve 44 during low speed operation. The damping force adjusting apparatus 40 generates the expansion side damping force based on the deflection of the expansion side disc valve 42A at middle and high speed areas. As a result of the compression side damping force and the expansion side damping force, compression and expansion vibration of the suspension spring 33 mentioned above is controlled.

The hydraulic shock absorber 10 is provided with an oil lock piece 46 which sits on a lower side of the spring seat 32 and stands up within the piston side oil chamber 21B, in a bottom portion of the inner tube 12, and which sets a lower end portion of the spring collar 31 to an oil lock collar 47. During maximum compression of the hydraulic shock absorber 10, the oil lock collar 47 fits to an outer periphery of the oil lock piece 46, thereby confining oil surrounded by the inner periphery of the inner tube 12, the oil lock piece 46 and the oil lock collar 47 to restrict the maximum compression stroke. Further, a stopper rubber 13A against which an upper end portion of the partition member 19 provided in the inner tube 12 abuts with the maximum compression stroke is firmly attached to the lower end surface of the cap 13. The maximum compression stroke is also restricted by this stopper robber 13A.

The hydraulic shock absorber 10 is structured such that a rebound spring 50 is interposed between a spring seat 48, which is caulked and fixed to the lower end surface facing to the piston rod side oil chamber 21A of the partition member 19 in the upper end side of the inner tube 12, and a spring collar 49 which is provided in a side of the upper end surface of the piston 26. During maximum expansion of the hydraulic shock absorber 10, the partition member 19 pressurizes the rebound spring 50, thereby restricting the maximum expansion stroke.

Figure 4:
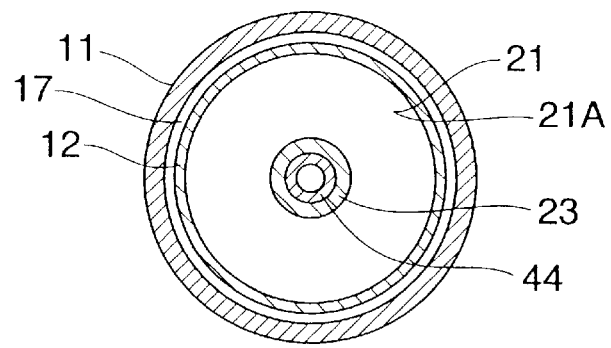
FIG. 4 is a cross sectional view along a line IV—IV in FIG. 3.

Accordingly, in the hydraulic shock absorber 10, as shown in FIG. 4, a cross sectional area S1 of the annular oil chamber 17 which is constituted by the annular gap of the outer tube 11 and the inner tube 12 is formed to be larger than a cross sectional area (an area surrounded by the outer diameter) S2 of the piston rod 23.

Figure 5:
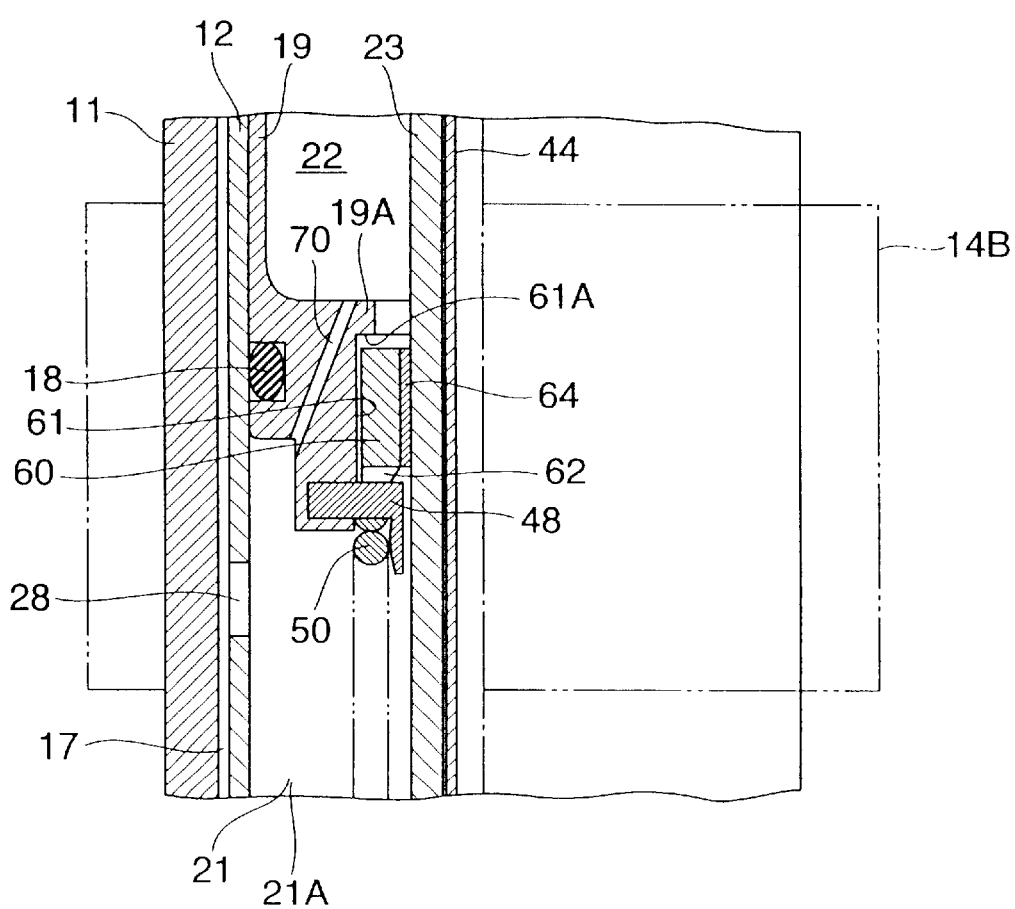
FIG. 5 is an enlarged cross sectional view of a main portion in FIG. 3.
Figure 6:
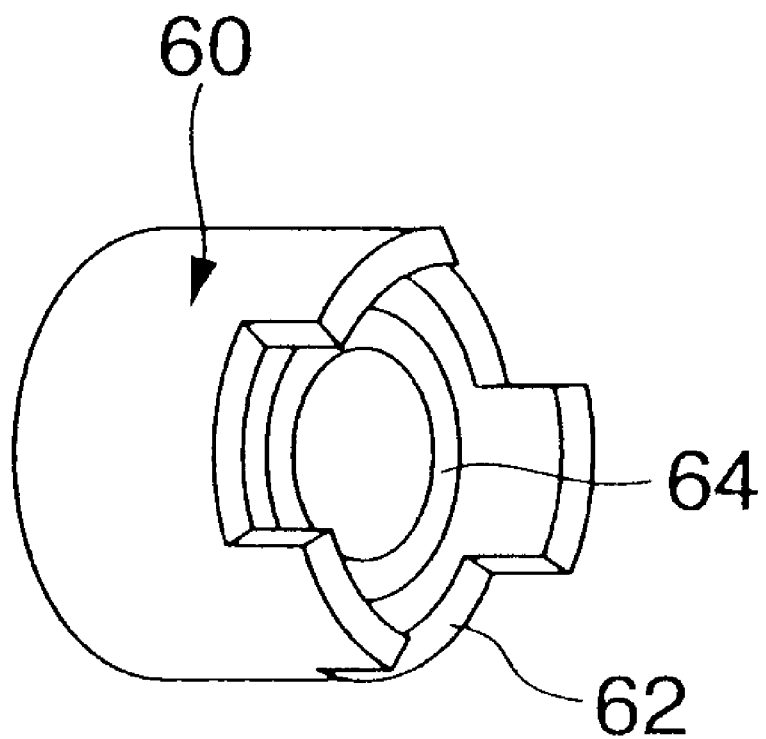
FIG. 6 is a perspective view which shows a check valve.

Further, as shown in FIG. 5, a check valve 60 which allows an oil flow from the oil storage chamber 22 to the piston rod side oil chamber 21A in the compression side stroke, and which inhibits oil flow from the piston rod side oil chamber 21A to the oil storage chamber 22 in the compression side stroke, is provided in the rod guide portion 19A of the partition member 19. A valve chamber 61 is provided in an inner periphery of the rod guide portion 19A of the partition member 19. The check valve 60 is received between a step portion 61A in an upper end side of the valve chamber 61, and the spring seat 48 mentioned above which is provided in a lower end side of the valve chamber 61. The check valve 60 is, as shown in FIG. 6, formed shorter than an interval between the step portion 61A and the spring seat 48. The check valve 60 has a transverse groove 62 formed on a lower end surface thereof, and has a bush 64 press fit into an inner periphery thereof. The check valve 60 is provided in such a manner as to be displacable upward and downward while being slidably in contact with an inner periphery of the valve chamber 61 provided in the rod guide portion 19A of the partition member 19, and which slidably supports the piston rod 23. An outer periphery of the check valve 60 forms a flow passage which allows an oil flow from the oil storage chamber 22 to the piston rod side oil chamber 21A, between the outer periphery of the check valve 60 and the inner periphery of the valve chamber 61 which is provided in the rod guide portion 19A of the partition member 19. In the compression side stroke, the check valve 60 moves together with the piston rod 23 which moves into the inner tube 12 so as to move to the lower position as shown in FIG. 5. The check valve 60 abuts against the spring seat 48, forms the gap between the check valve 60 and the step portion 61A, and can then discharge the oil in the piston rod side oil chamber 21A to the oil storage chamber 22 from the transverse groove 62 via the outer periphery thereof through the gap with respect to the step portion 61A. In the expansion side stroke, the check valve 60 moves together with the piston rod 23 which moves out from the inner tube 12 so as to move to the upper position as shown in FIG. 5. The check valve 60 abuts against the step portion 61A so as to close the gap between the check valve 60 and the step portion 61A, which prevents the oil in the piston rod side oil chamber 21A from being discharged to the oil storage chamber 22.

Further, as shown in FIG. 5, a micro flow passage (an orifice) 70 which communicates the piston rod side oil chamber 21A with the oil storage chamber 22 is provided in the rod guide portion 19A of the partition member 19.

An operation of the hydraulic shock absorber 10 is as follows.

(Compression Side Stroke)

The working fluid in correspondence to the incoming volumetric capacity of the piston rod 23 which moves into the inner tube 12 in the compression side stroke is transferred to the annular oil chamber 17 from the oil chamber 21A in the inner periphery of the inner tube 12 via the oil hole 28 of the inner tube 12. At this time, a volumetric capacity increase ΔS1 (a supply amount) of the annular oil chamber 17 is larger than a volumetric capacity increase ΔS2 of the piston rod 23. Therefore, a shortfall (ΔS1–ΔS2) in the necessary supply amount of the oil to the annular oil chamber 17 is supplied from the oil storage chamber 22 via the check valve 60.

In this compression side stroke, as mentioned above, the compression side damping force is generated as a result of the passage resistance of the bypass passage 45 which is adjusted in its opening degree by the needle valve 44, during low speed operation. The compression side damping force is generated based on the deflection of the compression side disc valve 41A, during middle and high speed operation.

(Expansion Side Stroke)

The working fluid corresponding to the on-going volumetric capacity of the piston rod 23 which moves out from the inner tube 12 in the expansion side stroke is transferred to the oil chamber 21A in the inner periphery of the inner tube 12 from the annular oil chamber 17, via the oil hole 28 of the inner tube 12. At this time, the volumetric capacity decrement ΔS1 (a discharge amount) of the annular oil chamber 17 is larger than a volumetric capacity decrement ΔS2 of the piston rod 23. Therefore, a surplus (ΔS1–ΔS2) in the discharge amount of the oil from the annular oil chamber 17 is discharged to the oil storage chamber 22 via the micro flow passage 70.

In this expansion side stroke, as mentioned above, the expansion side damping force is generated as a result of the passage resistance of the bypass passage 45 which is adjusted in its opening degree by the needle valve 44 during low speed operation. The expansion side damping force is generated based on the deflection of the expansion side disc valve 42A, in the middle and high speed areas. Further, the expansion side damping force is generated as a result of the passage resistance of the micro flow passage 70 mentioned above.

In this case, the volumetric capacity change amount based on the temperature change of the oil in the inner portion of the inner tube 12 is discharged to the oil storage chamber 22 via the micro flow passage 70, or is supplied from the oil storage chamber 22 so as to be compensated.

Therefore, according to the present embodiment, the following effects can be obtained.

(1) Since the cross sectional area S1 of the annular oil chamber 17 is made larger than the cross sectional area S2 of the piston rod 23, no delicate operation is required for setting the annular gap between the outer tube 11 and the inner tube 12, in comparison with the structure in which the areas S1 and S2 are made substantially equal. Accordingly, the pressure condition in the inner portion of the inner tube 12 is not changed due to working size tolerance differences between the outer tube 11 and the inner tube 12.

(2) Because of the item (1) mentioned above, even when the inner tube 12 has the larger diameter, in the case of using the piston rod 23 having the constant outer diameter, it is not always necessary to make the annular gap between the outer tube 11 and the inner tube 12 narrow, and no limitation is given to the design.

(3) Because of the item (1) mentioned above, even when the inner tube 12 has the larger diameter, in the case that the annular gap between the outer tube 11 and the inner tube 12 is made constant, it is not always necessary to make the outer diameter of the piston rod 23 large. Thus, it is possible to interchangably use the parts of the piston rod 23.

(4) Since the check valve 60 provided in the partition member 19 is provided in the inner periphery of the partition member 19, the check valve 60 is also responsible for the function of supporting the piston rod 23 by making it possible to slidably support the piston rod 23. As a result, it is possible to make the structure simple.

As mentioned above, according to the present invention, in the hydraulic shock absorber in which the piston is slidably in contact with the inner periphery of the inner tube, no delicate operation is required for setting the annular gap between the outer tube and the inner tube.

As heretofore explained, embodiments of the present invention have been described in detail with reference to the drawings. However, the specific configurations of the present invention are not limited to the embodiments but those having a modification of the design within the range of the present invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A hydraulic shock absorber for a vehicle comprising,
   an inner tube slidably insertable within an outer tube via bushes which are respectively fixed to an opening portion in an inner periphery of the outer tube and a front end portion in an outer periphery of the inner tube;
   a sectioned annular oil chamber which is surrounded by the inner periphery of the outer tube, the outer periphery of the inner tube and the two bushes;
   a partition member disposed in an inner periphery of the inner tube so as to section an oil chamber in a lower portion and section an air chamber in an upper portion;
   a piston rod which is mounted to the outer tube and which is slidably insertable to the partition member;
   a piston which is slidably in contact with the inner periphery of the inner tube and which is fixable to a front end portion of the piston rod which is inserted to the inner tube so as to section the oil chamber into a piston rod side oil chamber in which the piston rod is received and a piston side oil chamber in which the piston rod is not received; and
   the annular oil chamber being in fluid communication with the piston rod side oil chamber or the piston side oil chamber via an oil hole which is provided in the inner tube,
   wherein a cross sectional area of the annular oil chamber is formed larger than a cross sectional area of the piston rod, a check valve which inhibits a flow from the oil chamber into the oil storage chamber at a time of an expansion side stroke is provided in the partition member, and a micro flow passage which passes through the oil chamber and the oil storage chamber is provided in the partition member.

2. A hydraulic shock absorber for a vehicle according to claim 1, wherein the check valve provided in the partition member is disposed in an inner periphery of the partition member, and which supports the piston rod in such a manner as to freely slide.

3. A hydraulic shock absorber for a vehicle according to claim 2, wherein the check valve is placed in a valve chamber which is disposed in an inner periphery of the piston rod guide portion in the partition member,
   the check valve being shorter than an interval between upper and lower ends of the valve chamber, having a transverse groove formed on a lower end surface, and being in slidable contact with the inner periphery of the valve chamber so as to be displaceable upward and downward, and
   wherein an outer periphery of the check valve forms a flow passage which allows oil flow from the oil storage chamber to the piston side oil chamber between the outer periphery of the check valve and the inner periphery of the valve chamber.

* * * * *